US012600500B2

(12) United States Patent
Mora Plaza et al.

(10) Patent No.: US 12,600,500 B2
(45) Date of Patent: Apr. 14, 2026

(54) MULTIPLE HOLD DOWN AND RELEASE DEVICE AND METHOD FOR RELEASING A PAYLOAD FROM A SPACECRAFT

(71) Applicant: AIRBUS DEFENCE AND SPACE S.A., Getafe (ES)

(72) Inventors: José Luis Mora Plaza, Getafe (ES); Eugenio Alberto Grande Sáez, Getafe (ES)

(73) Assignee: Airbus Defence and Space S.A., Getafe (ES)

( * ) Notice: Subject to any disclaimer, the term of this patent is extended or adjusted under 35 U.S.C. 154(b) by 16 days.

(21) Appl. No.: 18/747,144

(22) Filed: Jun. 18, 2024

(65) Prior Publication Data

US 2024/0425208 A1      Dec. 26, 2024

(30) Foreign Application Priority Data

Jun. 20, 2023    (EP) .................................... 23382616

(51) Int. Cl.
  B64G 1/64      (2006.01)
  B64G 1/22      (2006.01)
(52) U.S. Cl.
  CPC ........... B64G 1/641 (2013.01); B64G 1/2228 (2023.08); B64G 1/645 (2013.01)
(58) Field of Classification Search
  CPC ...... B64G 1/641; B64G 1/2228; B64G 1/645; B64G 1/642; B64G 1/64; B64G 1/646; B64G 1/6455; B64G 1/6457
  See application file for complete search history.

(56) References Cited

U.S. PATENT DOCUMENTS

| | | | | |
|---|---|---|---|---|
| 4,489,329 A | * | 12/1984 | Vezain ................. | B64G 1/2228 |
| | | | | 343/705 |
| 12,006,072 B2 | * | 6/2024 | Grande Saez ....... | B64G 1/6457 |

FOREIGN PATENT DOCUMENTS

| | | | | | |
|---|---|---|---|---|---|
| DE | 3215432 | A1 | 10/1983 | | |
| EP | 0121959 | A1 | 10/1984 | | |
| EP | 2213572 | A1 | 8/2010 | | |
| EP | 2298648 | A | 3/2011 | | |
| JP | 2664992 | B2 * | 10/1997 | ............. | B64G 1/645 |
| RU | 2111905 | C1 | 5/1998 | | |
| RU | 2396191 | C1 | 8/2010 | | |
| WO | 2020/249831 | A1 | 12/2020 | | |

* cited by examiner

*Primary Examiner* — Arfan Y. Sinaki
(74) *Attorney, Agent, or Firm* — Merchant & Gould P.C.

(57)      ABSTRACT

A multiple hold down and release device for restraining and releasing a payload from a spacecraft performs methods to release a payload from a spacecraft and install a multiple hold down and release device. At a periphery, the device includes hold-down assemblies. Each assembly has a hold-down bracket configured to attach to the payload and a hold-down support, both having conical mating surfaces. Each hold-down support includes a torsion spring(s) around an axis. In pairs of connecting levers, each lever includes a first end coupling to a corresponding hold-down support such that each corresponding lever is articulated with the corresponding hold-down support through an axis; and a second end opposite the first end. Restraint cables join second ends of each pair of connecting levers and are arranged radially with a central area where the restraint cables cross. A central release actuator is configured for cutting the restraint cables.

14 Claims, 4 Drawing Sheets

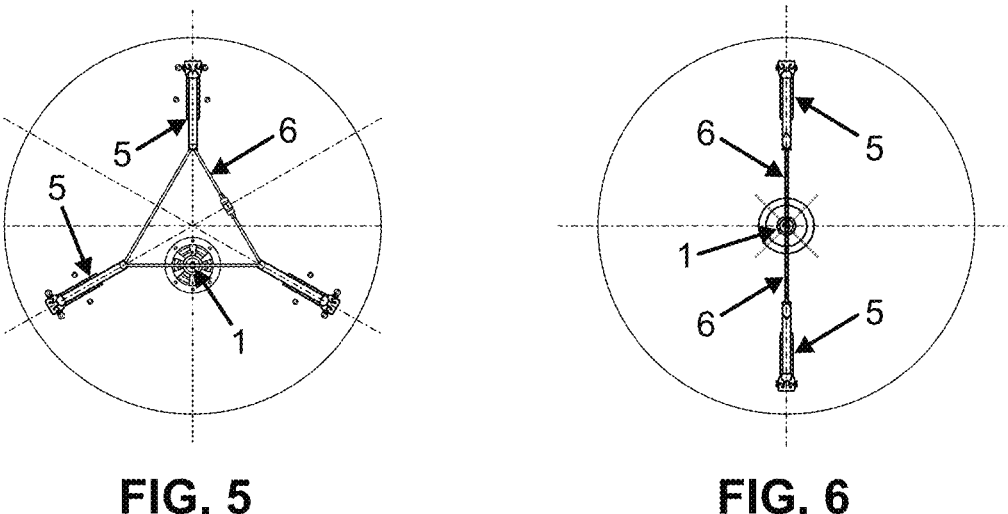
FIG. 5             FIG. 6
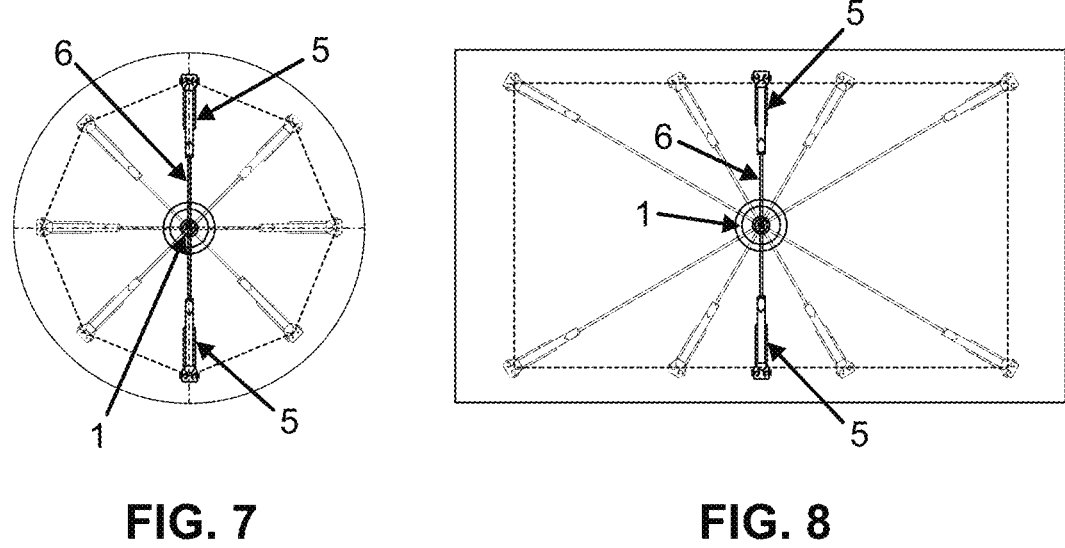
FIG. 7             FIG. 8

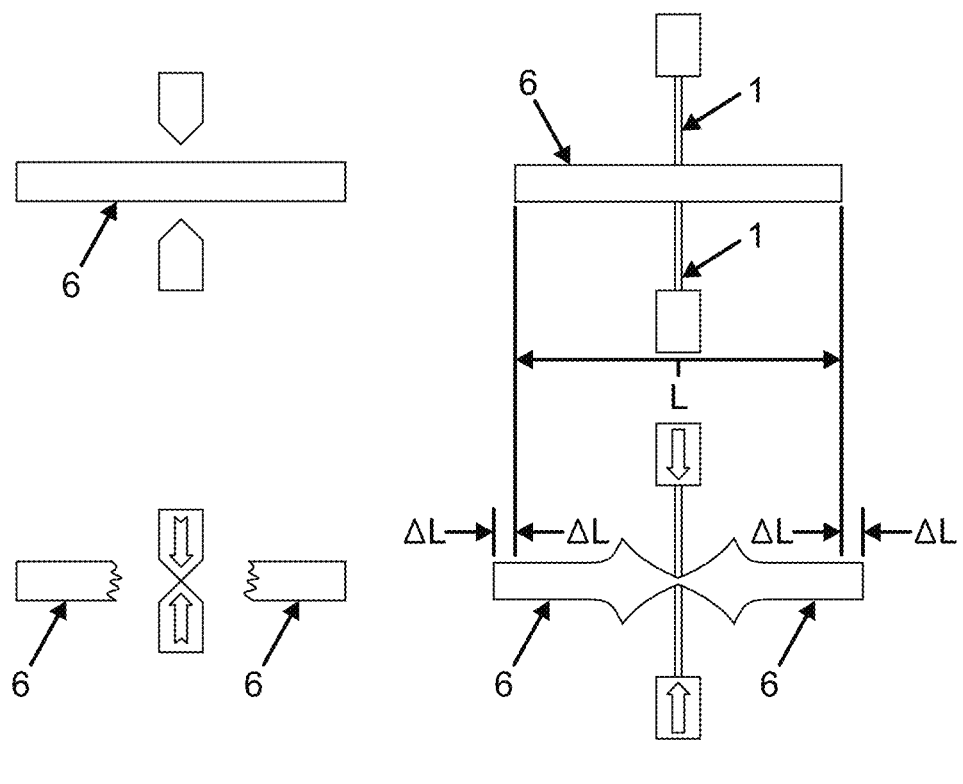
FIG. 9          FIG. 10
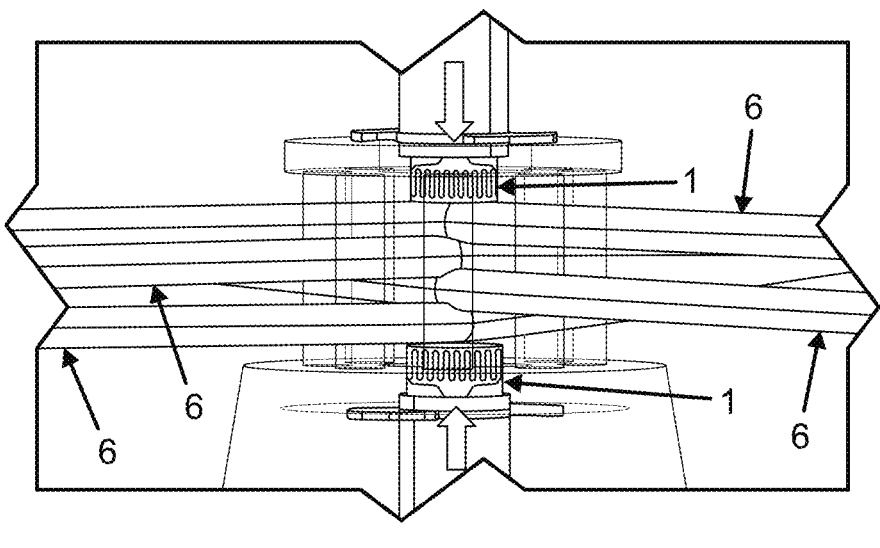
FIG. 11

MULTIPLE HOLD DOWN AND RELEASE DEVICE AND METHOD FOR RELEASING A PAYLOAD FROM A SPACECRAFT

CROSS REFERENCE TO RELATED APPLICATIONS

This application claims benefit of priority to European Patent Application No. 23382616.3, filed on Jun. 20, 2023, and which application is incorporated herein by reference. To the extent appropriate, a claim of priority is made to each of the above disclosed applications.

FIELD OF THE INVENTION

The invention refers to a device for providing hold down and release of a payload with respect to a spacecraft. It is used to restrain and release payloads such as antennae, solar panels, booms, etc. from a spacecraft, and belongs to the field of Holding-Down and Release Mechanisms (HDRM).

The invention also refers to a method to release a payload from a spacecraft and to a method to install such a multiple hold down and release device.

BACKGROUND OF THE INVENTION

In order to restrain all the deployable appendages that make part of a spacecraft during early stages of the mission, spacecrafts provide systems in charge of providing a stiff connection during launch, and to provide a safe release allowing deployment once it reaches its orbit.

In current solutions each payload is normally attached to the spacecraft through some discrete points (typically 2 to 6 points) named hold down and release mechanisms that preload the deployable appendages to the spacecraft.

Each payload requires a specific pattern of holding-down points, resulting in some cases in a considerable number of them, and therefore a high quantity of release actuators and all the associated equipment such as harnesses, activation signals, etc. per spacecraft. Release of this amount of discrete mechanisms must be accurately fired to ensure simultaneity in their actuation, implying a considerable power consumption for the satellite.

Therefore, the spacecraft must be designed to manage a big amount of separation signals (two per separation nut for redundancy). The initiation system could limit the number of separation signals in some cases, or to go for very expensive controller systems, converters and harness to manage the separations penalizing the cost and weight.

Another disadvantage for these systems is that many parts remain on the payload after separation.

The separation of this amount of discrete hold down and release mechanisms also generates a high shock during the separation event due to the rapid release of the preload (in some occasions fired by means of pyrotechnic actuators) close to the spacecraft interface.

One way to reduce the shock emitted by these holding-down and release systems is slowing down the release of the preload, which implies increasing the mechanism's activation time and dispersion, and thus penalizing the simultaneous separation of the hold down and release mechanisms.

This simultaneous separation is highly desired so that the distancing system usually formed by springs can eject the payload with the minimum angular disturbance during the separation.

The high reliability required to each one of the hold down and release mechanisms per spacecraft results in high percentage of the total cost of the separation system. These new satellite platforms are driven by cost and weight, so alternative solutions have to be addressed.

EP 2298648 A discloses a device for the restraint and release of a deployable body mounted on a support structure, the device being operable between a stowed condition and a released condition, and comprising: —a pair of subassemblies, each for being attached to either the deployable body or the support structure, these subassemblies comprising mating surfaces which interlock with one another in the stowed condition to substantially prevent lateral movement of the deployable body relative to the support structure; —a releasable tensioned element which is connected to both of the subassemblies, exerting a compressive pre-load action on the said subassemblies that keep them together; —a force measurement system that allows monitoring the cited compressive pre-load action applied; —a releasing device for releasing the cited pre-load, allowing the free separation of the subassemblies; it further comprises a pre-load application mechanism embedded in the device such that it applies a substantially pure-tension pre-load to the releasable tensioned element.

RU 2111905 C1 discloses a device for separating the rocket stage and the spacecraft to be separated, containing a pyroactuator with a piston installed in it, connected to the locking devices of the connecting elements, in which the pyroactuator is equipped with a split ring, the connecting elements are made in the form of a rod arranged in series, installed inside the piston with the possibility of their mutual movement, and a rod connected to the rod through a rotary knot, with the split ring installed on the piston between the shoulder of the piston and the end of the piston fixed to the rod.

RU 2396191 C1 discloses a payload separation system containing a detachable retention device installed between the load-bearing structure and the payload, which includes discretely placed mechanical locks with retaining and locking links on the load-bearing structure of the device, connected with a rotary multi-beam star, fixed with the possibility of rotation in the center of the circle of the locks' installation and held in the initial position from rotation by means of a pyroelectric means, as well as spring pushers for separation. The system of separating the load-bearing structure includes mechanical locks with retaining and locking links connected with the rotary multi-beam star, fixed with the possibility of rotation in the center of the circle of the locks' installation and held in the initial position from rotation by a pyroelectric means.

EP 2213572 A1 discloses a "Device for holding down a mobile structure to a spacecraft" that comprises a stationary structure fixed to the spacecraft, an actuator, a releasable member driven to movement in an axial direction relative to the stationary structure upon activation of the actuator and a locking assembly arranged to hold down or release the mobile structure depending on the axial position of the releasable member. The locking assembly comprises a plurality of circumferentially arranged locking members being movable in a radial direction into and out of engagement with the mobile structure at "V"-shaped groves that are arranged on a ring shaped plate which is attached to the appendage, the locking members being connected to the releasable member via first levers, such that the axial movement of the releasable member and the radial movement of the locking member are coupled with each other by way of a bent lever type mechanism.

WO2020/249831 A1 discloses an example of a Holding-Down and Release Mechanism (HDRM) to release small spacecraft from a launcher with a centralized actuator.

DE3215432 A1 depicts a centralized release system that holds down several discrete points by means of cranks. These cranks are preloaded with tensioned cables, connected among them by pulleys to achieve simultaneity on the release of all the hold-down and release mechanisms (HRM). When the release actuator frees the tension of the system, these cranks must drag the cables and pulleys, which can compromise that simultaneity.

EP0121959A1 discloses a holding-down and release system for discrete restraining points that applies the preload with a tensioned cable, which is cut with a heating element.

Other separation systems are disclosed in the document "Enabling Solutions for Small Satellite Space Access" (13$^{th}$ Reinventing Space Conference, November 2015), by Andreas Jonsson and Magnus Engström, in which several systems for multiple satellite launches are included. One of these systems consists of four hold down mechanisms and a plate structure, but with only one release point.

As for typical payloads attached through discrete points (antennae, solar arrays, booms, etc.), they are mainly latched and released through Holding-Down and Release Mechanisms (HDRM), requiring one release actuator at each point. The total amount of the release actuators is an indicator of the costs and reliability of the separation system, so the space industry is increasingly interested in the use of central-actuated systems.

Accordingly, there is a need to provide a multiple hold down and release device for restraining and releasing a payload from a spacecraft that reduces the overall mass, costs, induced loads on the structure and emitted shock during release without penalizing system's reliability.

SUMMARY OF THE INVENTION

The object of the invention is to provide a multiple hold down and release device for restraining and releasing for separation upon command a payload from a spacecraft that overcomes the mentioned drawbacks.

The invention provides a multiple hold down and release device for restraining and releasing a payload from a spacecraft that comprises:

a plurality of hold-down assemblies placed on the periphery of the device, each one of them comprising a hold-down bracket configured to be attached to the payload and a hold-down support joined to the spacecraft, both of them with conical mating surfaces, each hold-down support comprising at least one torsion spring around an axis, a plurality of pairs of connecting levers, each one of the connecting levers comprising a first end configured to be coupled to a corresponding hold-down support such that each corresponding lever is articulated with the corresponding hold-down support through the axis; and a second end opposite to the first end, a plurality of restraint cables that engage the second ends of each pair of connecting levers and are arranged radially with a central area where the restraint cables cross, and a central release actuator configured to be able to cut the restraint cables.

The invention also provides a multiple hold down and release device for restraining and releasing a payload from a spacecraft, that comprises:

a plurality of hold-down assemblies placed on the periphery of the device, each one of them comprising a hold-down bracket configured to be attached to the payload and a hold-down support joined to the spacecraft, both of them with conical mating surfaces, each hold-down support comprising at least one torsion spring around an axis, a plurality of connecting levers, each one of the connecting levers comprising a first end configured to be coupled to a corresponding hold-down support such that each corresponding lever is articulated with the corresponding hold-down support through the axis; and a second end opposite to the first end, one restraint cable that engages the second ends of the connecting levers, and a release actuator configured to be able to cut the restraint cable.

The invention also includes methods to release a payload from a spacecraft, and methods to install a multiple hold down and release device for restraining and releasing a payload from a spacecraft.

Other advantages of the invention are the following ones:

reduced overall costs, as only one central release actuator is required, reduced total mass, due to the reduction on release actuators, harnesses, batteries, etc.

gradual energy release, which is especially critical for shock-sensitive payloads, such as solar arrays or optical instruments.

It is also a versatile device, which allows to adapt the number of levers and restraint cables and their length according to the different needs.

Other characteristics and advantages of the present invention will be clear from the following detailed description of several embodiments illustrative of its object in relation to the attached figures.

BRIEF DESCRIPTION OF DRAWINGS

FIGS. 5, 6, 7 and 8 show bottom views of different configurations for multiple hold down and release devices of the invention.

FIGS. 9 and 10 show a view of a restraint cable before and after being cut by the central release actuator.

FIG. 11 shows a plurality of restraint cables arranged radially with a central area where the restraint cables cross and with a central release actuator.

DETAILED DESCRIPTION OF THE INVENTION

Figure 1:
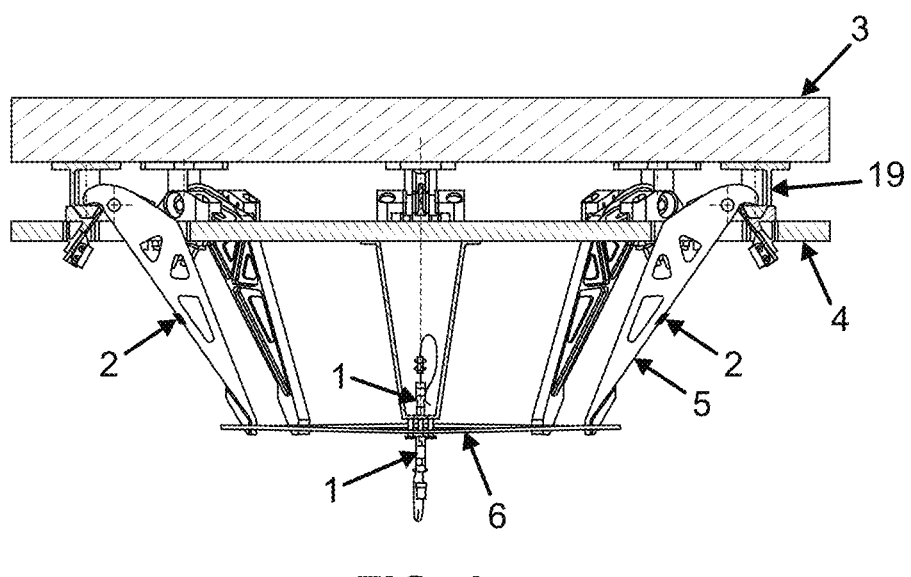
FIG. 1 shows a view of the multiple hold down and release device of the invention attaching a payload to a spacecraft in a stowed mode.
Figure 2:
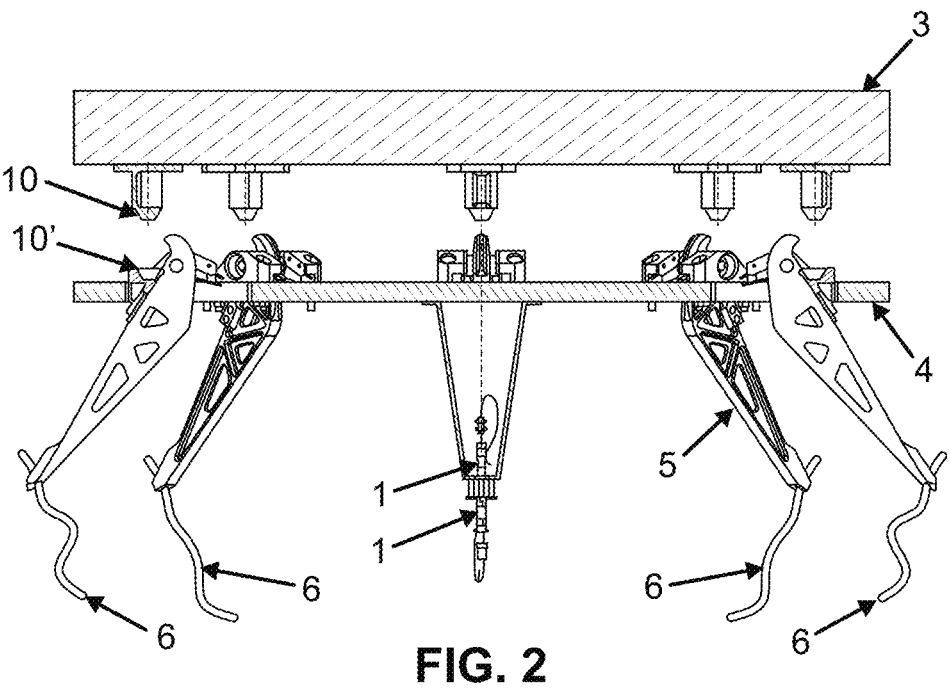
FIG. 2 shows a view of the multiple hold down and release device of FIG. 1 in a deployed mode.

FIG. 1 shows the multiple hold down and release device of the invention attaching a payload 3 to a spacecraft 4 in a closed or stowed mode, and FIG. 2 shows the multiple hold down and release device of FIG. 1 in an open or deployed mode, with the payload 3 released.

This multiple hold down and release device for restraining and releasing a payload 3 from a spacecraft 4 comprises:

a plurality of hold-down assemblies 19 (see FIGS. 3 and 4) placed on the periphery of the device, each one of them comprising a hold-down bracket 11 configured to be attached to the payload 3 and a hold-down support 20 joined to the spacecraft 4, both of them with conical mating surfaces 10, 10', each hold-down support 20 comprising at least one torsion spring 9 around an axis 17, a plurality of pairs of connecting levers 5, each one of the connecting levers 5 comprising a first end 14 configured to be coupled to a corresponding hold-down support 20 such that each corresponding lever 5 is articulated with the corresponding hold-down support 20 through an axis 17 and a second end 15 opposite to the first end 14, a plurality of restraint cables 6 (see FIGS. 5, 7 and 8) that engage the second ends 15 of each pair of connecting levers 5 and are arranged radially with a central area where the restraint cables 6 cross, and a central release actuator 1 configured to be able to cut the restraint cables 6.

Another version of the multiple hold down and release device for restraining and releasing a payload 3 from a spacecraft 4 is shown in FIG. 6, and comprises:

a plurality of hold-down assemblies 19 (see FIGS. 3 and 4) placed on the periphery of the device 1, each one of them comprising a hold-down bracket 11 configured to be attached to the payload 3 and a hold-down support 20 joined to the spacecraft 4, both of them with conical mating surfaces 10, 10', each hold-down support 20 comprising at least one torsion spring 9 around an axis 17, a plurality of connecting levers 5, each one of the connecting levers 5 comprising a first end 14 configured to be coupled to a corresponding hold-down support 20 such that each corresponding lever 5 is articulated with the corresponding hold-down support 20 through an axis 17; and a second end 15 opposite to the first end 14, one restraint cable 6 (see FIG. 6) that engages the second ends 15 of the connecting levers 5, and a release actuator 1 configured to be able to cut the restraint cable 6.

In the version of FIG. 6 one single restraint cable 6 can connect the second ends 15 of all the levers 5 simultaneously.

The device of the invention provides hold down and structural continuity between the payload 3 and the spacecraft 4 at the desired number and location of discrete points (hold down assemblies 19) and is released simultaneously by the activation of a unique release actuator 1.

Each of the hold-down assemblies 19 is composed by a fixed subassembly (hold down support 20) that stays on the spacecraft 4, and a hold down bracket 11 attached to the payload 3. Both of them stay together upon release by means of a cup-cone contact with conical mating surfaces 10, 10' preloaded by a release lever 5.

Figure 3:
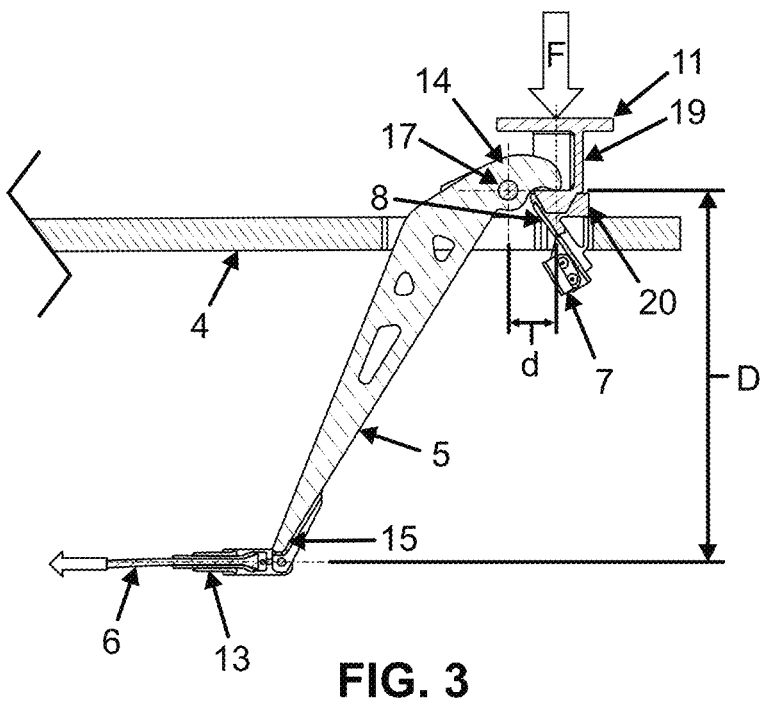
FIG. 3 shows a detailed view of several elements of the multiple hold down and release device of the invention in the stowed mode.
Figure 4:
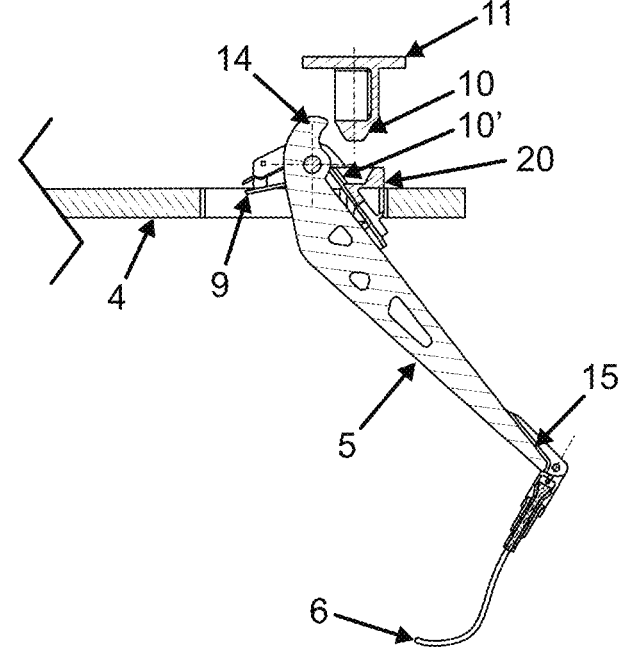
FIG. 4 shows a detailed view of several elements of the multiple hold down and release device of the invention in a deployed mode.

These levers 5 apply on the deployable bracket 11 a force F (D/d) times higher than the load f applied by the tension cable 6, according to FIG. 3, where distances D and d can be seen. This force F allows to retain the cone of the deployable bracket 11 within the cone of the hold down support 20. The load f is applied on the cables 6 through tensioning elements 13, and can be monitored through the preload measurement sensors 2 placed on the levers 5.

When the release actuator 1 slices the tensioned restraint cables 6, the involved levers 5 free the preload on the deployable brackets 11 and are retracted back around their axes 17 thanks to the at least one torsion spring 9.

The multiple hold down and release device for restraining and releasing a payload 3 from a spacecraft 4 may comprise a damper 8 on each hold-down support 20 that limits the motion of the lever 5 around the corresponding axis 17.

The multiple hold down and release device for restraining and releasing a payload 3 from a spacecraft 4, may additionally comprise a latch 7 on each hold-down support 20 suitable for retaining the corresponding lever 5.

Once retracted, the motion of the levers 5 is damped to reduce the shock emission, and they are captured in their final position in a latch 7 so that they do not compromise the deployment of the payload brackets 11.

The multiple hold down and release device for restraining and releasing a payload 3 from a spacecraft 4 may additionally comprise a strain gauge 2 on the connecting levers 5.

In another embodiment, the central release actuator 1 is a thermal knife or a cutter.

In another embodiment the restraint cables 6 are made of fusible material (for instance, Kevlar®, generically referred to as aramid fibers) that can be sliced with thermal knives or cuttable material (for instance, steel) for conventional cutter actuators.

The multiple hold down and release device for restraining and releasing a payload 3 from a spacecraft 4 may additionally comprise a tensioner 13 adjacent the second end 15 of each connecting lever 5 to apply preload on each second end 15 of each connecting lever 5.

In an embodiment, the hold-down assemblies 19 are arranged in a circular configuration in plan view (FIG. 5).

In an embodiment, the hold-down assemblies 19 are arranged in a polygonal configuration in plan view (FIGS. 7 and 8).

A method to release a payload 3 from a spacecraft 4 uses a multiple hold down and release device of FIG. 5, 7 or 8, such that in a hold down position the payload 3 is attached to the spacecraft 4 at a number of discrete points by means of the corresponding hold-downs brackets 11, the hold-down supports 20 being attached to the spacecraft 4, the method comprising the following steps:

activating the actuator 1, such that it cuts the restraint cables 6, the connecting levers 5 of each pair of connecting levers 5 are released from the corresponding restraint cable 6 and rotate by means of its elastic energy and the at least one torsion spring 9, and the first end 14 of each lever 5 is released from the corresponding hold-down bracket 11 to unlock the corresponding hold-down bracket 11, allowing the separation of the payload 3 from the spacecraft 4.

A method to install a multiple hold down and release device for restraining and releasing a payload from a spacecraft uses a multiple hold down and release device of FIG. 5, 7 or 8 comprising the following steps:

attaching the hold-down supports 20 to the spacecraft 4, attaching the hold-down brackets 11 to the payload 3, joining and preloading the second ends 15 of each pair of connecting levers 5 with a restraint cable 6, and attaching the central release actuator 1 to the spacecraft 4, such that the central release actuator 1 is placed on the central area where the restraint cables 6 cross.

A method to release a payload 3 from a spacecraft 4 uses a multiple hold down and release device of FIG. 6, such that in a hold down position the payload 3 is attached to the spacecraft 4 at a number of discrete points by means of the corresponding hold-downs brackets 11, the hold-down supports 20 being attached to the spacecraft 4, the method comprising the following steps:

activating the actuator 1, such that it cuts the restraint cable 6, the connecting levers 5 are released from the restraint cable 6 and rotate by means of its elastic energy and the at least one torsion spring 9, and the first end 14 of each lever 5 is released from the corresponding hold-down bracket 11 to unlock the corresponding hold-down bracket 11, allowing the separation of the payload 3 from the spacecraft 4.

A method to install a multiple hold down and release device for restraining and releasing a payload from a spacecraft, uses a multiple hold down and release device of FIG. 6, comprising the following steps:

attaching the hold-down supports 20 to the spacecraft 4, attaching the hold-downs brackets 11 to the payload 3, joining and preloading the second ends 15 of the connecting levers 5 with a restraint cable 6, and attaching the release actuator to the spacecraft 4 such that the release actuator 1 is placed on the restraint cable 6.

FIG. 11 show a release actuator 1 configured for simultaneous cutting of several restraint cables 6, while FIGS. 9 and 10 show a release actuator 1 configured to cut a restraint cable 6 little by little.

Although the present invention has been fully described in connection with preferred embodiments, it is evident that modifications may be introduced within the scope thereof, not considering this as limited by these embodiments, but by the contents of the following claims.

The invention claimed is:

1. A multiple hold down and release device for restraining and releasing a payload from a spacecraft, the multiple hold down and release device comprising:

a plurality of hold-down assemblies placed on a periphery of the device, each of the hold-down assemblies comprising a hold-down bracket configured to be attached to the payload and a hold-down support joined to the spacecraft, the hold-down bracket and the hold-down support each comprising conical mating surfaces, each hold-down support comprising at least one torsion spring around an axis of the torsion spring, a plurality of pairs of connecting levers, each of the connecting levers comprising a first end configured to be coupled to a corresponding hold-down support of the hold-down assemblies such that each corresponding lever is articulated with respect to the corresponding hold-down support through the corresponding axis, each of the connecting levers further comprising a second end opposite to the first end, a plurality of restraint cables engaging the second ends of each pair of connecting levers and arranged radially with a central area of the multiple hold-down and release device where the restraint cables cross, and a central release actuator configured to cut the restraint cables.

2. The multiple hold down and release device according to claim 1, further comprising a damper on each hold-down support that limits the motion of the lever around the corresponding axis.

3. The multiple hold down and release device according to claim 1, further comprising a latch on each hold-down support configured for retaining the corresponding lever after release.

4. The multiple hold down and release device according to claim 1, further comprising a strain gauge on each of the connecting levers.

5. The multiple hold down and release device according to claim 1, wherein the central release actuator is a thermal knife or a cutter.

6. The multiple hold down and release device according to claim 1, wherein the restraint cables are made of aramid fibers.

7. The multiple hold down and release device according to claim 1, further comprising a tensioner adjacent the second end of each connecting lever to apply preload on each second end of each connecting lever.

8. The multiple hold down and release device according to claim 1, wherein the hold-down assemblies are arranged in a circular configuration in plan view.

9. The multiple hold down and release device according to claim 1, wherein the hold-down assemblies are arranged in a polygonal configuration in plan view.

10. A method to release a payload from a spacecraft, the method using the multiple hold down and release device of claim 1, such that in a hold down position, the payload is attached to the spacecraft at a plurality of discrete points by the corresponding hold-downs brackets, the hold-down supports being attached to the spacecraft, the method comprising the following steps:

activating the release actuator, such that the release actuator cuts the restraint cables, the connecting levers of each pair of connecting levers are released from the corresponding restraint cable and rotate by the at least one torsion spring, and the first end of each lever is released from the corresponding hold-down bracket to unlock the corresponding hold-down bracket, allowing the separation of the payload from the spacecraft.

11. A method to install a multiple hold down and release device for restraining and releasing a payload from a spacecraft, the method using the multiple hold down and release device of claim 1, comprising the following steps:

attaching the hold-down supports to the spacecraft, attaching the hold-down brackets to the payload, joining and preloading the second ends of each pair of connecting levers with one of the restraint cables, and attaching the central release actuator to the spacecraft, such that the central release actuator is placed on the central area of the multiple hold down and release device where the restraint cables cross.

12. A multiple hold down and release device for restraining and releasing a payload from a spacecraft, the multiple hold down and release device comprising:

a plurality of hold-down assemblies placed on a periphery of the device, each of the hold-down assemblies comprising a hold-down bracket configured to be attached to the payload and a hold-down support joined to the spacecraft, the hold-down bracket and the hold-down support each comprising conical mating surfaces, each hold-down support comprising at least one torsion spring around an axis of the torsion spring, a plurality of connecting levers, each of the connecting levers comprising a first end configured to be coupled to a corresponding hold-down support of the hold-down assemblies such that each corresponding lever is articulated with respect to the corresponding hold-down support through the corresponding axis, each of the connecting levers further comprising a second end opposite to the first end, a restraint cable that engages the second ends of the connecting levers, and a release actuator configured to cut the restraint cable.

13. A method to release a payload from a spacecraft, the method using the multiple hold down and release device of claim 12, such that in a hold down position, the payload is attached to the spacecraft at a plurality of discrete points by the corresponding hold-downs brackets, the hold-down supports being attached to the spacecraft, the method comprising the following steps:

activating the actuator, such that the actuator cuts the restraint cable, the connecting levers are released from the restraint cable and rotate by the at least one torsion spring, and the first end of each lever is released from the corresponding hold-down bracket to unlock the corresponding hold-down bracket, allowing separation of the payload from the spacecraft.

14. A method to install a multiple hold down and release device for restraining and releasing a payload from a spacecraft, the method using the multiple hold down and release device of claim 12, comprising the following steps:

attaching the hold-down supports to the spacecraft, attaching the hold-down brackets to the payload, joining and preloading the second ends of the connecting levers with the restraint cable, and attaching the release actuator to the spacecraft such that the release actuator is placed on the restraint cable.

\* \* \* \* \*